United States Patent
Lee et al.

(10) Patent No.: US 11,856,624 B2
(45) Date of Patent: Dec. 26, 2023

(54) METHOD AND APPARATUS FOR INDICATING SIDELINK RADIO LINK FAILURE IN A WIRELESS COMMUNICATION SYSTEM

(71) Applicant: LG Electronics Inc., Seoul (KR)

(72) Inventors: Youngdae Lee, Seoul (KR); Giwon Park, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/887,914

(22) Filed: Aug. 15, 2022

(65) Prior Publication Data

US 2022/0394792 A1     Dec. 8, 2022

Related U.S. Application Data

(63) Continuation of application No. 17/692,429, filed on Mar. 11, 2022, now Pat. No. 11,483,885, which is a
(Continued)

(30) Foreign Application Priority Data

Nov. 7, 2019   (KR) ..................... 10-2019-0142096

(51) Int. Cl.
  *H04W 76/14*   (2018.01)
  *H04W 76/20*   (2018.01)
  (Continued)

(52) U.S. Cl.
  CPC .......... *H04W 76/14* (2018.02); *H04L 1/1812* (2013.01); *H04W 76/18* (2018.02); *H04W 76/20* (2018.02); *H04W 76/23* (2018.02); *H04W 92/18* (2013.01)

(58) Field of Classification Search
  CPC ...... H04L 76/14; H04W 76/14; H04W 76/18; H04W 76/19; H04W 76/20; H04W 76/23; H04W 92/18
  See application file for complete search history.

(56) References Cited

U.S. PATENT DOCUMENTS

2014/0206372 A1   7/2014   Zeng
2021/0136856 A1   5/2021   Tseng et al.

FOREIGN PATENT DOCUMENTS

CN        109983817          7/2019
WO    WO-2018233709 A1 *   12/2018

OTHER PUBLICATIONS

Feng et al. "Communication Method and Device," English Machine Translation of Feng (WO 2018233709 A1), Clarivate Analytics, pp. 1-39 (Year: 2023).*

(Continued)

*Primary Examiner* — Thomas R Cairns
(74) *Attorney, Agent, or Firm* — Fish & Richardson P.C.

(57) ABSTRACT

A method and apparatus for indicating sidelink (SL) radio link failure (RLF) in a wireless communication system is provided. A first wireless device may initialize the counter to zero upon 1) establishing the PC5-RRC connection with the second wireless device, or 2) configuring or reconfiguring the maximum number of the counter. A first wireless device may increase the counter based on no reception of any acknowledgement to the transmission of the MAC PDU. A first wireless device may indicate Sidelink (SL) Radio Link Failure (RLF) for the PC5-RRC connection based on that the counter reaches the maximum number of the counter.

18 Claims, 14 Drawing Sheets

Related U.S. Application Data continuation of application No. PCT/KR2020/015493, filed on Nov. 6, 2020.

(51) Int. Cl.
  *H04L 1/1812* (2023.01)
  *H04W 76/18* (2018.01)
  *H04W 76/23* (2018.01)
  *H04W 92/18* (2009.01)

(56) References Cited

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 15)," TS 36.321 V15.7.0, Sep. 2019, 134 pages.

Ericsson, "LS on SL RLF handling," R2-1914118, Presented at 3GPP TSG-RAN WG2 #107bis, Chongqing, P.R. China, Oct. 14-18, 2019, 1 page.

LG Electronics, "Remaining issue on PC5 RLM/RLF," R2-1913884, Presented at 3GPP TSG-RAN WG2 Meeting #107bis, Chongqing, China, Oct. 14-18, 2019, 3 pages.

Motorola Mobility & Lenovo, "RLM Procedure and RLF Recovery handling," R2-1912567, Presented at 3GPP TSG RAN WG2 Meeting 107bis, Chongqin, PRC, Oct. 14-18, 2019, 4 pages.

Samsung, "Remaining Issues on SL RLM/RLF Declaration for NR V2X Unicast," R2-1912445 (Revision of R2-1911329), Presented at 3GPP TSG-RAN WG2 Meeting #107bis, Chongqing, China, Oct. 14-18, 2019, 2 pages.

\* cited by examiner

METHOD AND APPARATUS FOR INDICATING SIDELINK RADIO LINK FAILURE IN A WIRELESS COMMUNICATION SYSTEM

CROSS-REFERENCE TO RELATED APPLICATIONS

This application is a continuation of U.S. application Ser. No. 17/692,429, filed on Mar. 11, 2022, which is a continuation pursuant to 35 U.S.C. § 119(e), of International Application PCT/KR2020/015493, with an international filing date of Nov. 6, 2020, which claims the benefit of Korean Patent Application No. 10-2019-0142096, filed on Nov. 7, 2019, the contents of which are hereby incorporated by reference herein in their entirety.

BACKGROUND

Technical Field

The present disclosure relates to a method and apparatus for indicating sidelink (SL) radio link failure (RLF) in a wireless communication system.

Related Art rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

Technical Objects

A wireless device may establish a unicast link and the associated PC5-RRC connection with another wireless device in sidelink.

In this case, a wireless device may monitor the quality of the PC5-RRC connection based on hybrid automatic repeat request (HARQ) retransmissions. In this case, it is unclear how the wireless device declares link failure on the PC5-RRC connection.

Therefore, studies for indicating sidelink (SL) radio link failure (RLF) in a wireless communication system are required.

Technical Solutions

In an aspect, a method performed by a first wireless device in a wireless communication system is provided. A first wireless device may initialize the counter to zero upon 1) establishing the PC5-RRC connection with the second wireless device, or 2) configuring or reconfiguring the maximum number of the counter. A first wireless device may increase the counter based on no reception of any acknowledgement to the transmission of the MAC PDU. A first wireless device may indicate Sidelink (SL) Radio Link Failure (RLF) for the PC5-RRC connection based on that the counter reaches the maximum number of the counter.

In another aspect, an apparatus for implementing the above method is provided.

Technical Effects

The present disclosure can have various advantageous effects.

According to some embodiments of the present disclosure, a wireless device could indicate sidelink (SL) radio link failure (RLF) in a wireless communication system efficiently.

For example, a wireless device performing radio link management by using HARQ feedback can properly detect radio link failure by considering HARQ feedback transmissions from another wireless device.

For example, a UE can properly detect radio link failure by considering HARQ feedback transmissions from another UE when the UE establishes a sidelink connection with a peer UE.

For example, a wireless communication system could properly provide radio link management for sidelink connection for a UE performing HARQ transmissions.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
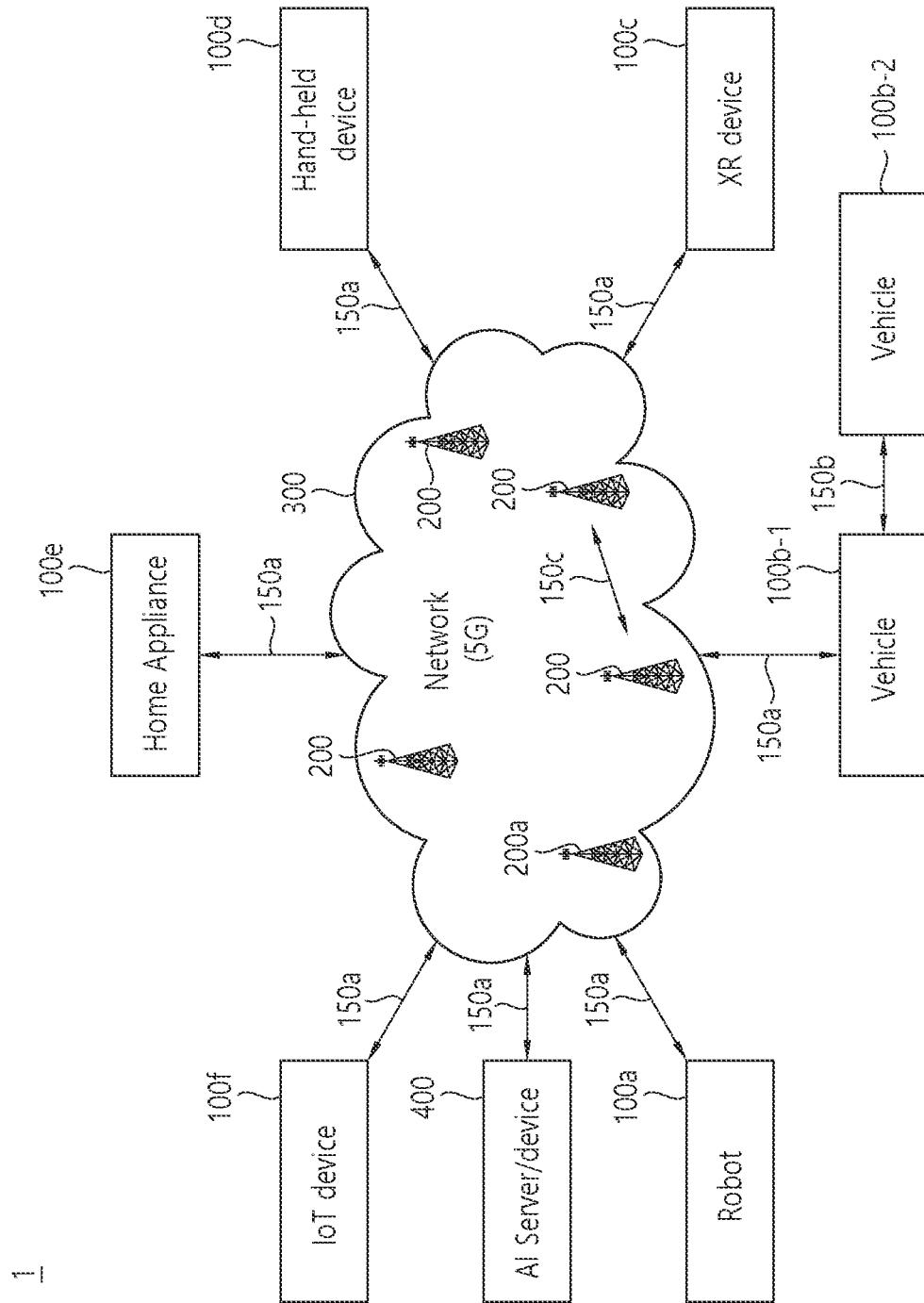
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example. "A/B" may mean "A and/or B". Accordingly, "A/B" may mean "only A", "only B", or "both A and B". For example, "A, B. C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure. "at least one of A. B and C" may mean "only A". "only B", "only C", or "any combination of A, B and C". In addition. "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT)(e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
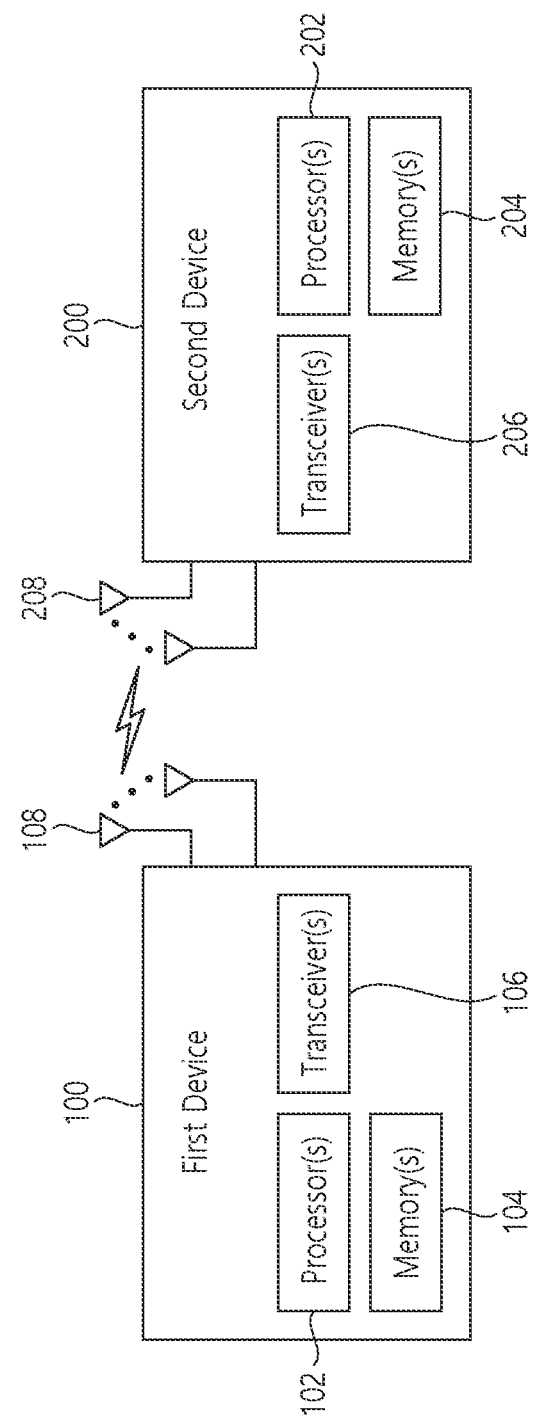
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs. SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
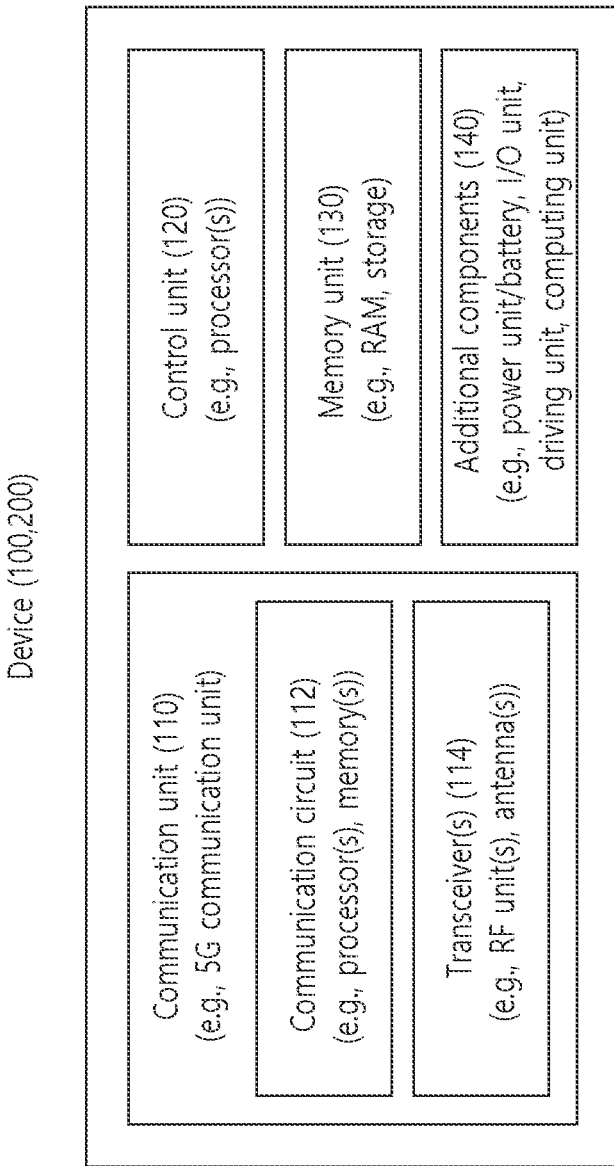
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
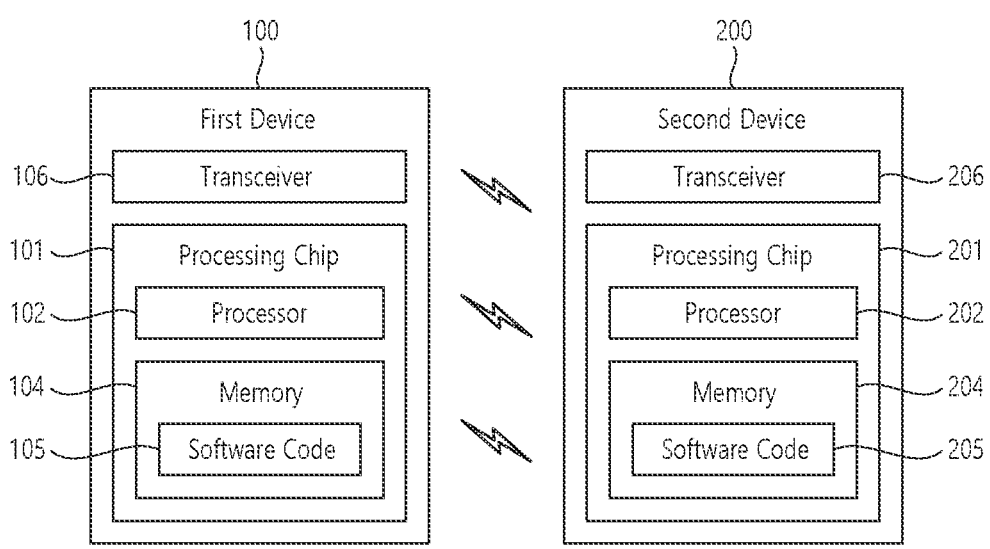
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
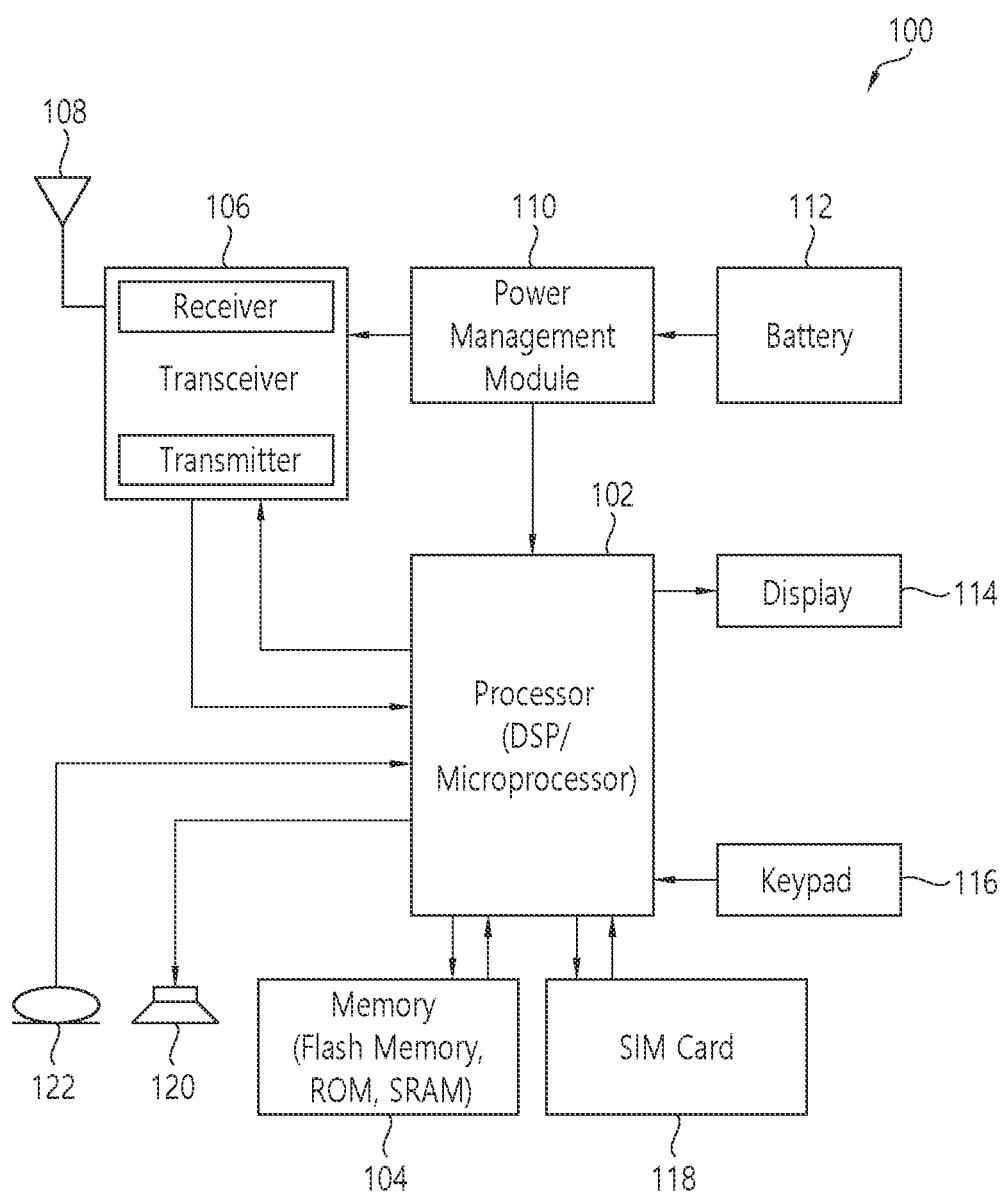
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung*, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
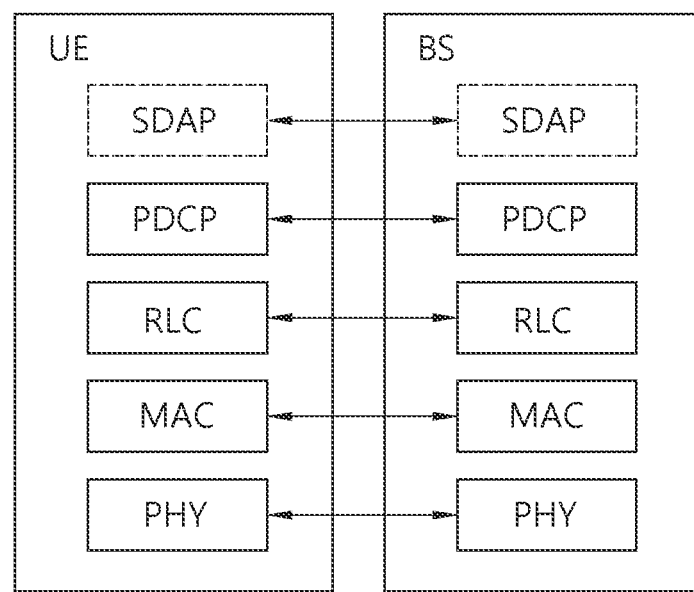
FIGS. 6 and 7 show an example of protocol stacks in a 3GPP based wireless communication system to which implementations of the present disclosure is applied.
Figure 7:
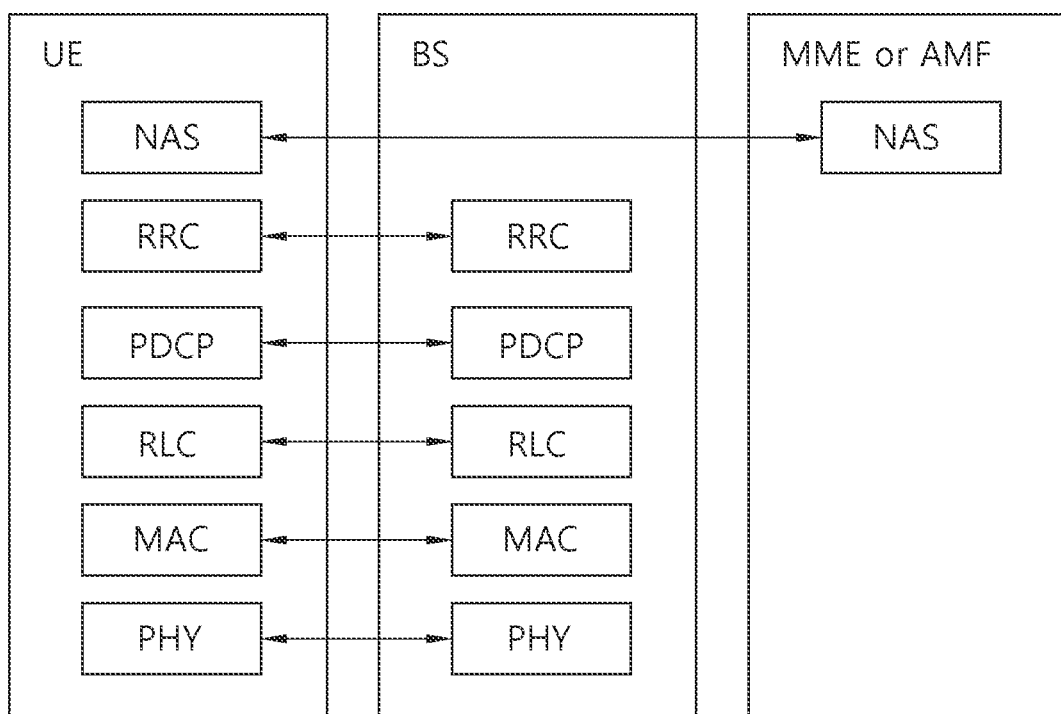

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
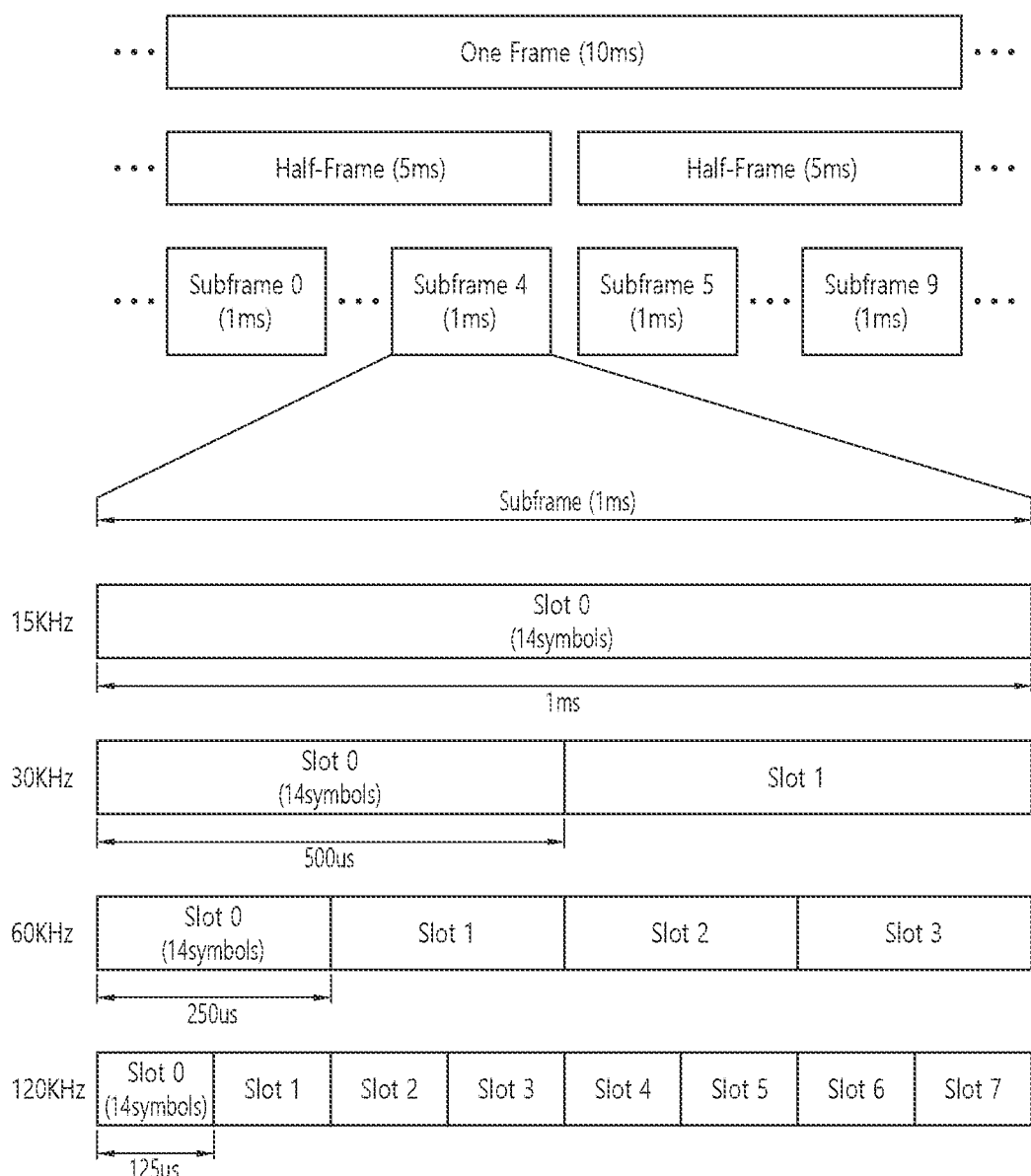
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u \cdot 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u \cdot 15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u \cdot 15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} \cdot N^{RB}_{sc}$ subcarriers and $N^{subframe,u}_{symb}$ OFDM symbols is defined, starting at common resource block (CRB) $N^{size,u}_{grid,x}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
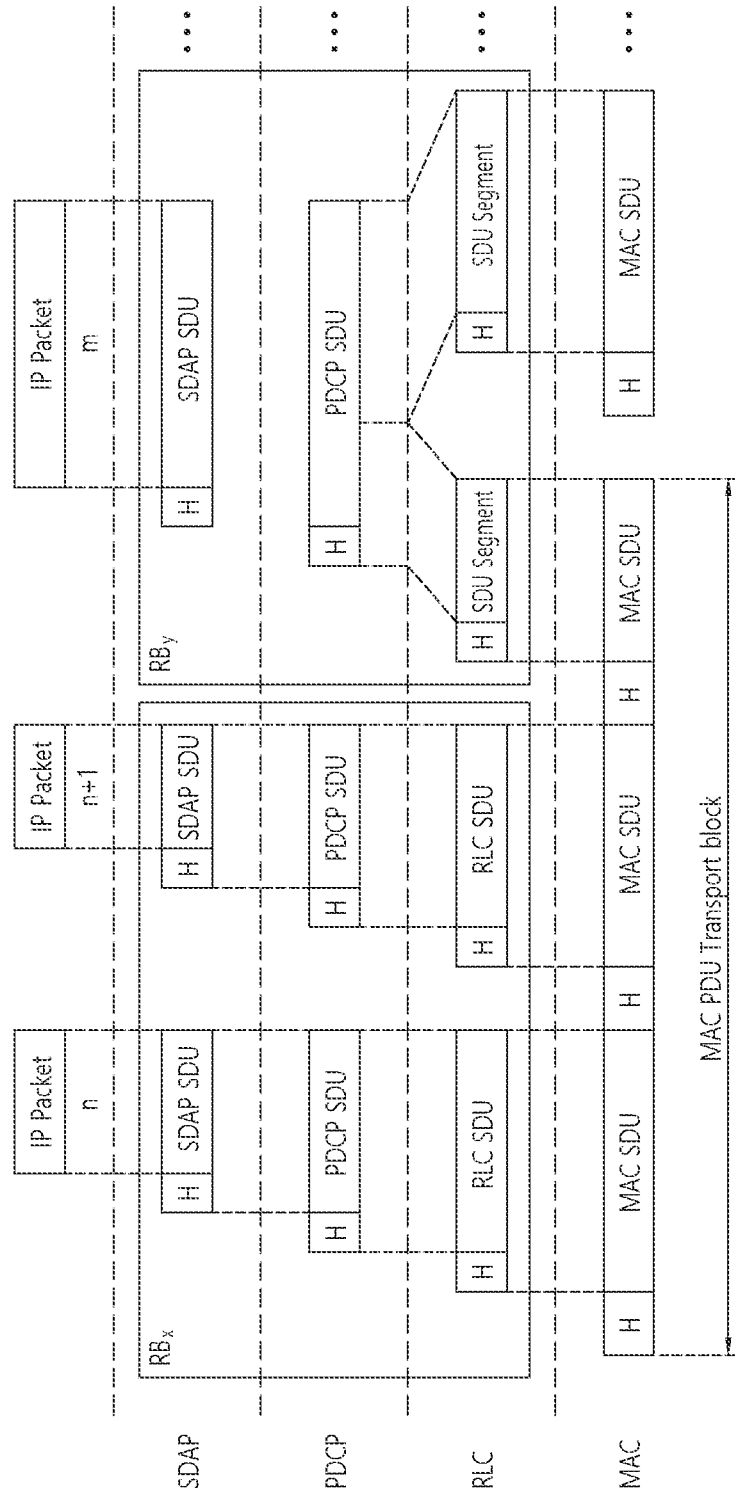
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.
4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
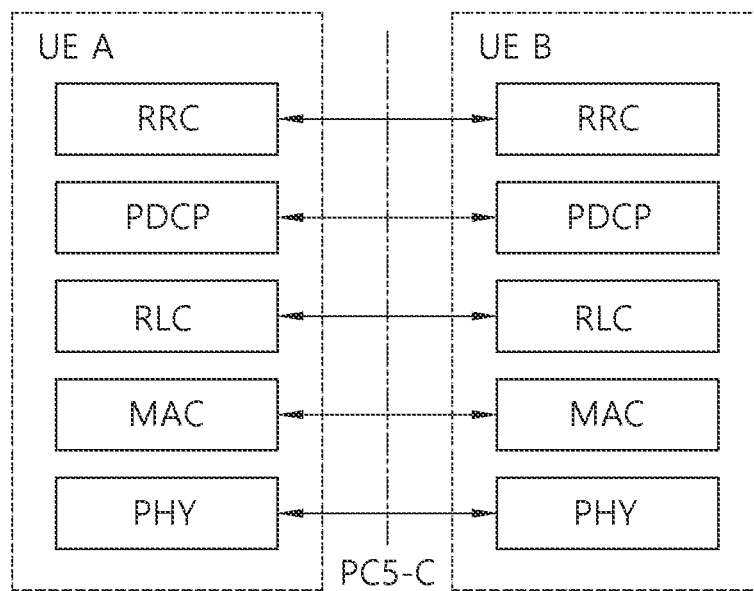
FIGS. 10 and 11 show an example of PC5 protocol stacks to which implementations of the present disclosure is applied.
Figure 11:
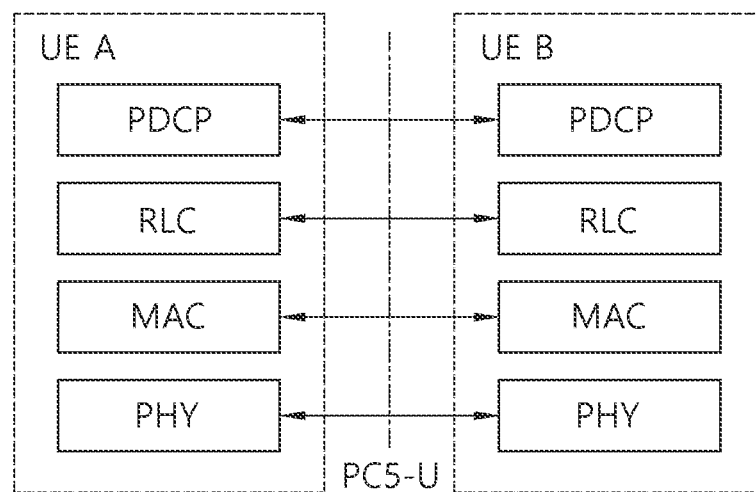

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:
  The layer-1 destination ID, conveyed via physical sidelink control channel (PSCCH)
  Additional layer-1 ID(s), conveyed via PSCCH, at least for the purpose of identifying which transmissions can be combined in reception when HARQ feedback is in use
  HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:
  Unicast: destination ID, source ID
  Groupcast: destination group ID, source ID Discovery procedure and related messages for the unicast and groupcast transmission are up to upper layers.

At least the following two SL resource allocation modes are defined as follows.
  (1) Mode 1: BS schedules SL resource(s) to be used by UE for SL transmission(s).
  (2) Mode 2: UE determines, i.e., BS does not schedule, SL transmission resource(s) within SL resources configured by BS/network or pre-configured SL resources.

The definition of SL resource allocation Mode 2 covers:
  a) UE autonomously selects SL resource for transmission
  b) UE assists SL resource selection for other UE(s)
  c) UE is configured with NR configured grant (Type-1 like) for SL transmission
  d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:
  Decoding of SL control channel transmissions
  SL measurements
  Detection of SL transmissions The following aspects may be considered for SL resource selection:
  How a UE selects resource for PSCCH and physical sidelink shared channel (PSSCH) transmission (and other SL physical channel/signals that are defined)
  Which information is used by UE for resource selection procedure Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:
  Scheduling UE is configured by gNB
  Application layer or pre-configuration selects scheduling UE
  Receiver UE schedules transmissions of the transmitter UE during the session
  Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

Hereinafter, Sidelink HARQ operation is described. It may be referred to as Section 5.14.1.2 of 3GPP TS 36.321 v15.7.0.

Sidelink HARQ Entity is described.

The MAC entity is configured by upper layers to transmit using pool(s) of resources on one or multiple carriers. For each carrier, there is one Sidelink HARQ Entity at the MAC entity for transmission on SL-SCH, which maintains a number of parallel Sidelink processes.

For V2X sidelink communication, the maximum number of transmitting Sidelink processes associated with each Sidelink HARQ Entity is 8. A sidelink process may be configured for transmissions of multiple MAC PDUs. For transmissions of multiple MAC PDUs, the maximum number of transmitting Sidelink processes associated with each Sidelink HARQ Entity is 2.

A delivered and configured sidelink grant and its associated HARQ information are associated with a Sidelink process.

For each subframe of the SL-SCH and each Sidelink process, the Sidelink HARQ Entity shall:
  if a sidelink grant corresponding to a new transmission opportunity has been indicated for this Sidelink process and there is SL data, for sidelink logical channels of ProSe destination associated with this sidelink grant, available for transmission:
  obtain the MAC PDU from the "Multiplexing and assembly" entity;
  deliver the MAC PDU and the sidelink grant and the HARQ information to this Sidelink process;
  instruct this Sidelink process to trigger a new transmission.
  else, if this subframe corresponds to retransmission opportunity for this Sidelink process:
  instruct this Sidelink process to trigger a retransmission.

Sidelink process is described.

The Sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant and with the MCS selected.

If the sidelink process is configured to perform transmissions of multiple MAC PDUs for V2X sidelink communication the process maintains a counter SL_RESOURCE_RESELECTION_COUNTER. For other configurations of the sidelink process, this counter is not available.

If the Sidelink HARQ Entity requests anew transmission, the Sidelink process shall:
  set CURRENT_IRV to 0;
  store the MAC PDU in the associated HARQ buffer;
  store the sidelink grant received from the Sidelink HARQ Entity;
  generate a transmission as described below.

If the Sidelink HARQ Entity requests a retransmission, the Sidelink process shall:
  generate a transmission as described below.
  To generate a transmission, the Sidelink process shall:
  if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and
  if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:
  instruct the physical layer to generate a transmission according to the stored sidelink grant with the redundancy version corresponding to the CURRENT_IRV value.
  increment CURRENT_IRV by 1;
  if this transmission corresponds to the last transmission of the MAC PDU:
  decrement SL_RESOURCE_RESELECTION_COUNTER by 1, if available.

The transmission of the MAC PDU for V2X sidelink communication is prioritized over uplink transmissions if the following conditions are met:
  if the MAC entity is not able to perform all uplink transmissions and all transmissions of V2X sidelink communication simultaneously at the time of the transmission; and
  if uplink transmission is not prioritized by upper layer: and
  if the value of the highest priority of the sidelink logical channel(s) in the MAC PDU is lower than thresSL-TxPrioritization if thresSL-TxPrioritization is configured.

Hereinafter, Random Access Channel (RACH) procedure in NR is described.

For NR, RACH can be configured either 2-step RACH or 4-step RACH.

For 4-step RACH, UE transmits a RACH preamble, receives Random Access Response MAC CE, transmits a message 3 on PUSCH, and receive Contention Resolution MAC CE.

For 2-step RACH, UE transmits a message A consisting of a RACH preamble and PUSCH resource, and receives a message B consisting of Random Access Response and Contention Resolution.

Meanwhile, UE may establish a unicast link and the associated PC5-RRC connection with other UE in sidelink.

In this case. UE may monitor the quality of the PC5-RRC connection based on HARQ retransmissions. In this case, it is unclear how the UE declares link failure on the PC5-RRC connection.

Therefore, studies for indicating sidelink radio link failure in a wireless communication system are required.

Hereinafter, a method and apparatus for indicating sidelink radio link failure in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 12:
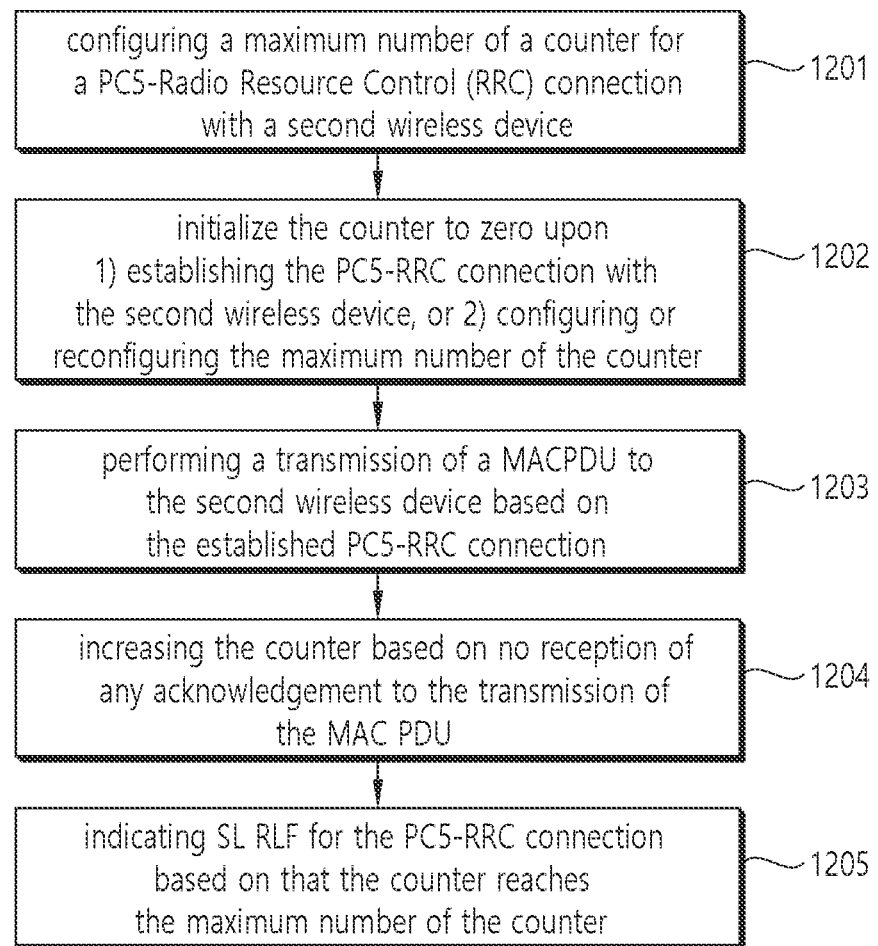
FIG. 12 shows an example of a method for indicating sidelink radio link failure in a wireless communication system, according to some embodiments of the present disclosure.

FIG. 12 shows an example of a method for indicating sidelink radio link failure in a wireless communication system, according to some embodiments of the present disclosure.

In particular, FIG. 12 shows an example of a method performed by a wireless device.

In step 1201, a first wireless device may configure a maximum number of a counter for a PC5-Radio Resource Control (RRC) connection with a second wireless device.

For example, a first wireless device may establish a PC5-S unicast link and the associated PC5-RRC connection with the second wireless device.

For example, the network may send RRC Reconfiguration message to the first wireless device. The RRC Reconfiguration message may include the maximum number of the counter for the PC5-RRC connection with the second wireless device.

For other example, the first wireless device may configure the maximum number of the counter for the PC5-RRC connection with the second wireless device, by itself.

For example, the first wireless device may configure the counter for each of multiple PC5-RRC connections with other wireless devices.

In step 1202, a first wireless device may initialize the counter to zero upon 1) establishing the PC5-RRC connection with the second wireless device, or 2) configuring or reconfiguring the maximum number of the counter.

According to some embodiments of the present disclosure, the first wireless device may configure another counter for another PC5-RRC connection with a third wireless device.

In this case, the first wireless device may initialize the other counter to zero upon 1) establishing the other PC5-RRC connection with the third wireless device, or 2) configuring or reconfiguring a maximum number of the other counter for the other PC5-RRC connection with the third wireless device.

For example, a maximum number of the other counter for the other PC5-RRC connection with the third wireless device may be same as the maximum number of the counter for the PC5-RRC connection with the second wireless device.

For example, the maximum number of the counter for the PC5-RRC connection with the second wireless device and the maximum number of the other counter for the PC5-RRC connection with the third wireless device could be configured or reconfigured simultaneously.

For other example, a maximum number of the other counter for the other PC5-RRC connection with the third wireless device could be different from the maximum number of the counter for the PC5-RRC connection with the second wireless device.

For example, the maximum number of the counter for the PC5-RRC connection with the second wireless device and the maximum number of the other counter for the PC5-RRC connection with the third wireless device could be configured or reconfigured independently.

In step 1203, a first wireless device may perform a transmission of a Medium Access Control (MAC) Protocol Data Unit (PDU) to the second wireless device based on the established PC5-RRC connection.

For example, the transmission of the MAC PDU may include a PSSCH transmission for a pair of source layer-2 ID of the first wireless device and destination layer 2-ID of the second wireless device corresponding to the PC5-RRC connection.

For example, PSSCH may carry data from a UE for sidelink communication and V2X sidelink communication.

For example, PSCCH may be mapped to the sidelink control resources. For example, PSCCH may indicate resource and other transmission parameters used by a UE for PSSCH. For V2X sidelink communication, PSCCH and PSSCH could be transmitted in the same subframe.

In step 1204, a first wireless device may increase the counter based on no reception of any acknowledgement to the transmission of the MAC PDU.

For example, a first wireless device may monitor each Physical Sidelink Feedback Channel (PSFCH) reception occasion associated to the transmission of the MAC PDU. Based on that PSFCH reception is absent on the PSFCH reception occasion, the first wireless device may increment the counter.

According to some embodiments of the present disclosure, a first wireless device may re-initialize the counter to zero based on reception of any acknowledgement to the transmission of the MAC PUD.

For example, a first wireless device may monitor each PSFCH reception occasion associated to the transmission of the MAC PDU. Based on that PSFCH reception is not absent on the PSFCH reception occasion, the first wireless device may re-initialize the counter to zero.

According to some embodiments of the present disclosure, a first wireless device may configure an N value for re-initializing the counter to zero.

For example, the N value is a natural number. For example, the N value could be one.

For example, the first wireless device may re-initialize the counter to zero if N acknowledgements have been received on PSFCH either consecutively or in an interval.

For example, the N acknowledgements may correspond to only positive acknowledgements successfully received on PSFCH.

For example, the N acknowledgements may correspond to only negative acknowledgements successfully received on PSFCH.

For example, the N acknowledgements may correspond to both positive and negative acknowledgements successfully received on PSFCH.

For example, the N acknowledgements may not include unsuccessful reception of any acknowledgement on PSFCH.

In step 1205, a first wireless device may indicates Sidelink (SL) Radio Link Failure (RLF) for the PC5-RRC connection based on that the counter reaches the maximum number of the counter.

According to some embodiments of the present disclosure, a first wireless device may indicate the SL RLF for the PC5-RRC connection by informing the SL RLF to the network.

According to some embodiments of the present disclosure, a SL Hybrid automatic repeat request (HARQ) entity of a first wireless device may indicate the SL RLF for the PC5-RRC connection to an RRC entity of the first wireless device.

According to some embodiments of the present disclosure, a first wireless device may be in communication with at least one of a user equipment, a network, or an autonomous vehicle other than the first wireless device.

Figure 13:
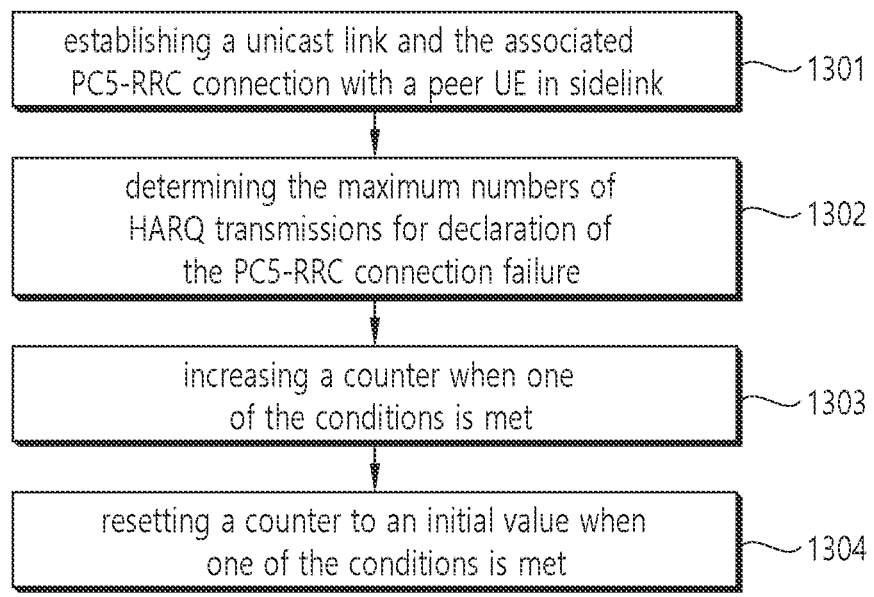
FIG. 13 shows an example of a method for performing data transmission by a UE in a wireless communication system, according to some embodiments of the present disclosure.

FIG. 13 shows an example of a method for performing data transmission by a UE in a wireless communication system, according to some embodiments of the present disclosure.

In step 1301, UE may establish a unicast link and the associated PC5-RRC connection with a peer UE in sidelink.

In step 1302, UE may determine the maximum numbers of HARQ transmissions for declaration of the PC5-RRC connection failure.

For example, the maximum numbers of HARQ transmissions for declaration of the PC5-RRC connection failure may be configured by the network or the peer UE.

For other example, UE may determine the maximum numbers of HARQ transmissions for declaration of the PC5-RRC connection failure based on the QoS parameters of logical channels belonging to the PC5-RRC connection or the unicast link.

In step 1303, UE may increase a counter when one of the following conditions is met:
- if no acknowledgement to a transmission of any MAC PDU (e.g. HARQ feedback) has been received; and/or
- if a negative acknowledgement to a transmission of any MAC PDU has been received.

In step 1304, UE may reset a counter to an initial value (e.g. zero) when one of the following conditions is met:
- if a parameter related to establishment of a PC5-RRC connection or PC5-S unicast link is indicated by upper layers: and/or
- if a very first new transmission is triggered by this sidelink HARQ entity for the PC5-RRC connection; and/or
- if N acknowledgements (for example, HARQ feedbacks) have been received either consecutively or within an interval.

Figure 14:
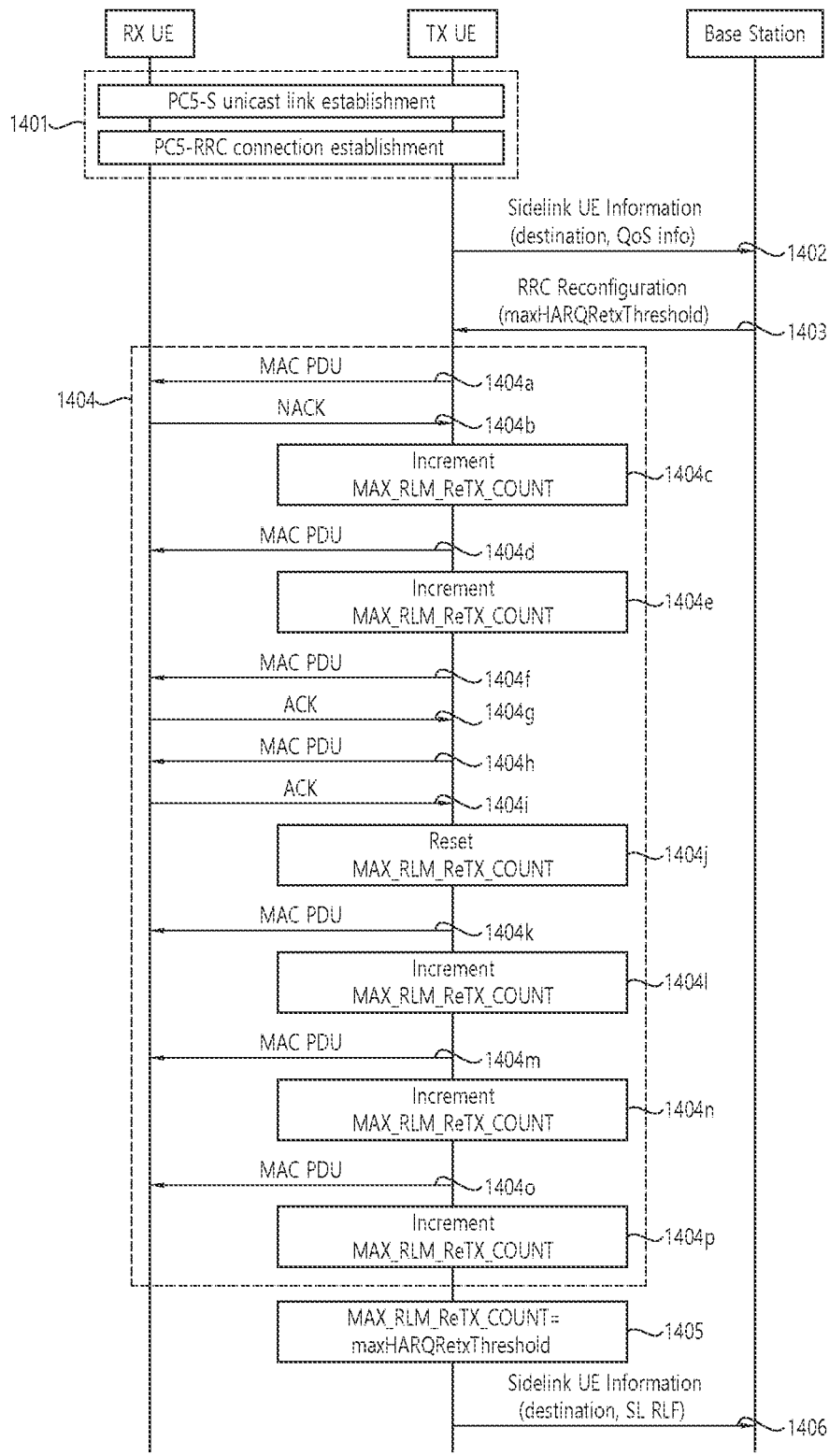
FIG. 14 shows an example of method for sidelink HARQ transmissions and failure detection from a UE in a wireless communication system, according to some embodiments of the present disclosure.

FIG. 14 shows an example of method for sidelink HARQ transmissions and failure detection from a UE in a wireless communication system, according to some embodiments of the present disclosure.

In particular FIG. 14 shows an example of sidelink HARQ transmissions and failure detection from a UE according to the present disclosure. However, it is clear that present disclosure is not limited thereto. The present disclosure could be applied to quality reporting for uplink data transmission as well.

In step 1401, TX UE may establish a PC5-S unicast link and the associated PC5-RRC connection with RX UE.

In step 1402, TX UE may send Sidelink UE information indicating the destination ID of the RX UE to the network. TX UE may indicate the destination ID and the associated QoS information to the network via the Sidelink UE Information. The destination ID may be associated to a destination index according to the contents of the Sidelink UE Information.

In step 1403, upon receiving the Sidelink UE information, the network may send RRC Reconfiguration message to the TX UE. The message may include N value and maxHARQRetxThreshold with the destination index.

In TX UE, the Sidelink HARQ Entity may maintain an N value, maxHARQRetxThreshold and MAX_RLM_ReTX_COUNT for each PC5-RRC connection that has established by RRC (or for each PC5-S unicast link established by PC5-S entity, each destination or each pair of a Source Layer-2 ID and a Destination Layer-2 ID).

The N value and maxHARQRetxThreshold may be configured by RRC for the PC5-RRC connection (or the PC5-S unicast link established by PC5-S entity, the destination or the pair of a Source Layer-2 ID and a Destination Layer-2 ID).

The Sidelink HARQ Entity may correspond both receiving and transmitting Sidelink HARQ Entity or either receiving or transmitting Sidelink HARQ Entity.

The maxHARQRetxThreshold may be configured with the value of the maxHARQRetxThreshold configured for the logical channel with the highest priority belonging to the PC5-RRC connection or with the lowest, an average or highest value of all maxHARQRetxThreshold values configured for all logical channels belonging to the PC5-RRC connection (or the PC5-S unicast link established by PC5-S entity, the destination or the pair of a Source Layer-2 ID and a Destination Layer-2 ID).

The N value may be configured with the value of the N value configured for the logical channel with the highest priority belonging to the PC5-RRC connection or with the lowest, an average or highest value of all N values configured for all logical channels belonging to the PC5-RRC connection (or the PC5-S unicast link established by PC5-S entity, the destination or the pair of a Source Layer-2 ID and a Destination Layer-2 ID).

The Sidelink HARQ Entity in TX UE may set the MAX_RLM_ReTX_COUNT to zero for each PC5-RRC connection that has established by RRC (or for each PC5-S unicast link established by PC5-S entity, each destination or each pair of a Source Layer-2 ID and a Destination Layer-2 ID), when one of the following conditions is met:
- if max-HARQRetxThreshold is configured by RRC (for example, initial step of HARQ based RLM e.g. upon establishment of a PC5-RRC connection or PC5-S unicast link); and/or
- if a parameter related to establishment of a PC5-RRC connection or PC5-S unicast link is indicated by upper layers; and/or
- if a very first new transmission is triggered by this sidelink HARQ entity for the PC5-RRC connection (or the PC5-S unicast link established by PC5-S entity, the destination or the pair of a Source Layer-2 ID and a Destination Layer-2 ID): and/or
- if N acknowledgements have been received on PSFCH either consecutively or in an interval (Wherein N can be one or more):
  - The N acknowledgements may correspond to only positive acknowledgements successfully received on PSFCH; and/or
  - The N acknowledgements may correspond to only negative acknowledgements successfully received on PSFCH; and/or
  - The N acknowledgements may correspond to both positive and negative acknowledgements successfully received on PSFCH; and/or
  - The N acknowledgements may not include unsuccessful reception of any acknowledgement on PSFCH (for example, either no HARQ feedback transmission of an acknowledgement from a peer UE (for example, because the peer UE does not successfully receive the corresponding PSCCH and/or PSSCH) or no reception of HARQ feedback transmission from a peer UE (for example, because this UE does not successfully receive the corresponding PSFCH).

In step 1404, the Sidelink HARQ Entity in TX UE may increment the MAX_RLM_ReTX_COUNT for each PC5-RRC connection that has established by RRC (or for each PC5-S unicast link established by PC5-S entity, each destination or each pair of a Source Layer-2 ID and a Destination Layer-2 ID), when one of the following conditions is met:
- if no acknowledgement to a transmission of any MAC PDU has been received on PSFCH; and/or Option 1: the acknowledgement may only correspond to a positive acknowledgement successfully received on PSFCH;

Option 2: the acknowledgement may only correspond to a negative acknowledgement successfully received on PSFCH;

Option 3: the acknowledgement may only correspond to either a positive or a negative acknowledgement successfully received on PSFCH;

if a negative acknowledgement to a transmission of any MAC PDU has been received on PSFCH.

For example, in step 1404*a*, TX UE may transmit a MAC PDU to RX UE. In step 1404*b*, TX UE may receive the NACK from RX UE. In step 1404*c*, based on receiving the NACK related to the MAC PDU, TX UE may increment the MAX_RLM_ReTX_Count.

For example, in step 1404*d*, TX UE may transmit a MAC PDU to RX UE. In step 1404*e*, based on no reception of any acknowledgement (ACK or NACK) related to the MAC PDU, TX UE may increment the MAX_RLM_ReTX_Count.

For example, in step 1404*f*, TX UE may transmit a MAC PDU to RX UE. In step 1404*g*, TX UE may receive an ACK from RX UE. In step 1404*h*, TX UE may transmit a MAC PDU to RX UE. In step 1404*i*, TX UE may receive an ACK from RX UE. In step 1404*j*, based on that TX UE receives two consecutive ACK from RX UE (for example, the N value may be configured as two), the TX UE may reset the MAX_RLM_ReTX_Count.

For example, in step 1404*k*, TX UE may transmit a MAC PDU to RX UE. In step 1404*l*, based on no reception of any acknowledgement (ACK or NACK) related to the MAC PDU, TX UE may increment the MAX_RLM_ReTX_Count. In step 1404*m*, TX UE may transmit a MAC PDU to RX UE. In step 1404*n*, based on no reception of any acknowledgement related to the MAC PDU, TX UE may increment the MAX_RLM_ReTX_Count. In step 1404*o*, TX UE may transmit a MAC PDU to RX UE. In step 1404*p*, based on no reception of any acknowledgement related to the MAC PDU, TX UE may increment the MAX_RLM_ReTX_Count.

In step 1405, if MAX_RLM_ReTX_COUNT reaches maxHARQRetxThreshold, the MAC entity in TX UE may indicate to RRC that max HARQ retransmission has been reached for each PC5-RRC connection that has established by RRC (or for each PC5-S unicast link established by PC5-S entity, each destination or each pair of a Source Layer-2 ID and a Destination Layer-2 ID)

In step 1406, upon receiving this indication from the MAC entity, TX UE RRC may declare sidelink radio link failure on the corresponding PC5-RRC connection (or the corresponding pair or the corresponding destination) and indicate sidelink radio link failure to the network.

According to some embodiments of the present disclosure, the UL transmissions and SL transmissions could be performed for different RATs or the same RAT.

The present disclosure could be also applied to radio link failure of different uplink transmissions to different base stations, for example, configured for dual connectivity or carrier aggregation in uplink. In this case, the TX UE in FIG. 14 can be replaced by the same or a different base station.

Hereinafter, a method for indicating sidelink radio link failure in a wireless communication system, according to some embodiments of the present disclosure will be described. The method may be performed by a wireless device, for example, a UE.

According to some embodiments of the present disclosure, a UE may perform Sidelink HARQ operation.

For example, a sidelink HARQ Entity of a UE may perform the following operations.

The MAC entity includes at most one Sidelink HARQ entity for transmission on SL-SCH, which maintains a number of parallel Sidelink processes.

The maximum number of transmitting Sidelink processes associated with the Sidelink HARQ Entity is [TBD]. [A sidelink process may be configured for transmissions of multiple MAC PDUs. For transmissions of multiple MAC PDUs, the maximum number of transmitting Sidelink processes associated with the Sidelink HARQ Entity is [TBD].]

A delivered sidelink grant and its associated HARQ information are associated with a Sidelink process. Each Sidelink process supports one TB.

For each sidelink grant, the Sidelink HARQ Entity shall:

1> associate a Sidelink process to this grant, and for each associated Sidelink process:

2> if the MAC entity determines that the sidelink grant is used for initial transmission, and if no MAC PDU has been obtained:

For the configured grant Type 1 and 2, whether a sidelink grant is used for initial transmission or retransmission is up to UE implementation.

3> obtain the MAC PDU to transmit from the Multiplexing and assembly entity, if any;

3> if a MAC PDU to transmit has been obtained:

4> deliver the MAC PDU, the sidelink grant and the HARQ information and the QoS information of the TB to the associated Sidelink process;

4> instruct the associated Sidelink process to trigger a new transmission;

3> else:

4> flush the HARQ buffer of the associated Sidelink process.

2> else (i.e. retransmission):

3> if a positive acknowledgement to a transmission of the MAC PDU has been received, or 3> if only a negative acknowledgement is configured and no negative acknowledgement is for the most recent (re-)transmission of the MAC PDU:

4> clear the sidelink grant;

4> flush the HARQ buffer of the associated Sidelink process;

3> else:

4> deliver the sidelink grant and HARQ information and QoS information of the MAC PDU to the associated Sidelink process:

4> instruct the associated Sidelink process to trigger a retransmission.

The Sidelink HARQ Entity maintains an N value, maxHARQRetxThreshold and MAX_RLM_ReTX_COUNT only for unicast in sidelink for each PC5-RRC connection that has established by RRC (or for each PC5-S unicast link established by PC5-S entity, each destination or each pair of a Source Layer-2 ID and a Destination Layer-2 ID). The N value and maxHARQRetxThreshold are configured by RRC for the PC5-RRC connection (or the PC5-S unicast link established by PC5-S entity, the destination or the pair of a Source Layer-2 ID and a Destination Layer-2 ID).

Wherein the Sidelink HARQ Entity corresponds both receiving and transmitting Sidelink HARQ Entity or either receiving or transmitting Sidelink HARQ Entity.

Alternatively, the maxHARQRetxThreshold is configured with the value of the maxHARQRetxThreshold configured for the logical channel with the highest priority belonging to the PC5-RRC connection or with the lowest, an average or highest value of all maxHARQRetxThreshold values configured for all logical channels belonging to the PC5-RRC connection (or the PC5-S unicast link established by PC5-S entity, the destination or the pair of a Source Layer-2 ID and a Destination Layer-2 ID).

Alternatively, the N value is configured with the value of the N value configured for the logical channel with the highest priority belonging to the PC5-RRC connection or with the lowest, an average or highest value of all N values configured for all logical channels belonging to the PC5-RRC connection (or the PC5-S unicast link established by PC5-S entity, the destination or the pair of a Source Layer-2 ID and a Destination Layer-2 ID).

The Sidelink HARQ Entity shall for each PC5-RRC connection that has established by RRC (or for each PC5-S unicast link established by PC5-S entity, each destination or each pair of a Source Layer-2 ID and a Destination Layer-2 ID):

1> if maxHARQRetxThreshold is configured by RRC (i.e. initial step of HARQ based RLM e.g. upon establishment of a PC5-RRC connection or PC5-S unicast link); or 1> if a parameter related to establishment of a PC5-RRC connection or PC5-S unicast link is indicated by upper layers: or 1> if a very first new transmission is triggered by this sidelink HARQ entity for the PC5-RRC connection (or the PC5-S unicast link established by PC5-S entity, the destination or the pair of a Source Layer-2 ID and a Destination Layer-2 ID); or 1> if N acknowledgements have been received on PSFCH either consecutively or in an interval; or Option 1: the N acknowledgements correspond to only positive acknowledgements successfully received on PSFCH;

Option 2: the N acknowledgements correspond to only negative acknowledgements successfully received on PSFCH;

Option 3: the N acknowledgements correspond to both positive and negative acknowledgements successfully received on PSFCH;

Wherein the N acknowledgements do not include unsuccessful reception of any acknowledgement on PSFCH (i.e. either no HARQ feedback transmission of an acknowledgement from a peer UE (e.g. because the peer UE does not successfully receive the corresponding PSCCH and/or PSSCH) or no reception of HARQ feedback transmission from a peer UE (e.g. because this UE does not successfully receive the corresponding PSFCH). Wherein N can be one or more.

2> set the MAX_RLM_ReTX_COUNT to zero.

1> if no acknowledgement to a transmission of any MAC PDU has been received on PSFCH; or Option 1: the acknowledgement only corresponds to a positive acknowledgement successfully received on PSFCH:

Option 2: the acknowledgement only corresponds to a negative acknowledgement successfully received on PSFCH:

Option 3: the acknowledgement only corresponds to either a positive or a negative acknowledgement successfully received on PSFCH;

1> if a negative acknowledgement to a transmission of any MAC PDU has been received on PSFCH:

2> increment the MAX_RLM_ReTX_COUNT.

1> if MAX_RLM_ReTX_COUNT=maxHARQRetxThreshold:

indicate to RRC that max HARQ retransmission has been reached.

Upon receiving this indication from the MAC entity. UE RRC declares sidelink radio link failure on the corresponding PC5-RRC connection (or the corresponding pair or the corresponding destination).

Hereinafter, a method for indicating sidelink radio link failure in a wireless communication system, according to some embodiments of the present disclosure will be described. The method may be performed by a wireless device, for example, a UE.

According to some embodiments of the present disclosure, a UE may perform Sidelink HARQ operation.

For example, a sidelink HARQ Entity of a UE may perform the following operations.

The MAC entity includes at most one Sidelink HARQ entity for transmission on SL-SCH, which maintains a number of parallel Sidelink processes.

There is at most one Sidelink HARQ Entity at the MAC entity for reception of the SL-SCH, which maintains a number of parallel Sidelink processes.

Each Sidelink process is associated with SCI in which the MAC entity is interested. This interest is as determined by the Destination Layer-1 ID and the Source Layer-1 ID of the SCI. The Sidelink HARQ Entity directs HARQ information and associated TBs received on the SL-SCH to the corresponding Sidelink processes.

The number of Receiving Sidelink processes associated with the Sidelink HARQ Entity is defined in [TBD].

For each PSSCH duration, the Sidelink HARQ Entity shall:

1> for each SCI valid for this PSSCH duration:
2> if this PSSCH duration corresponds to new transmission opportunity according to this SCI:
3> allocate the TB received from the physical layer and the associated HARQ information to an unoccupied Sidelink process, associate the Sidelink process with this SCI and consider this transmission to be a new transmission.

1> for each Sidelink process:
2> if this PSSCH duration corresponds to retransmission opportunity for the Sidelink process according to its associated SCI:
3> allocate the TB received from the physical layer and the associated HARQ information to the Sidelink process and consider this transmission to be a retransmission.

The Sidelink HARQ Entity maintains an N value, maxHARQRetxThreshold and MAX_RLM_ReTX_COUNT only for unicast in sidelink for each PC5-RRC connection that has established by RRC (or for each PC5-S unicast link established by PC5-S entity, each destination or each pair of a Source Layer-2 ID and a Destination Layer-2 ID). The N value and maxHARQRetxThreshold are configured by RRC for the PC5-RRC connection (or the PC5-S unicast link established by PC5-S entity, the destination or the pair of a Source Layer-2 ID and a Destination Layer-2 ID).

Wherein the Sidelink HARQ Entity corresponds both receiving and transmitting Sidelink HARQ Entity or either receiving or transmitting Sidelink HARQ Entity.

Alternatively, the maxHARQRetxThreshold is configured with the value of the maxHARQRetxThreshold configured for the logical channel with the highest priority belonging to the PC5-RRC connection or with the lowest, an average or highest value of all maxHARQRetxThreshold values configured for all logical channels belonging to the PC5-RRC connection (or the PC5-S unicast link established by PC5-S entity, the destination or the pair of a Source Layer-2 ID and a Destination Layer-2 ID).

Alternatively, the N value is configured with the value of the N value configured for the logical channel with the highest priority belonging to the PC5-RRC connection or with the lowest, an average or highest value of all N values configured for all logical channels belonging to the PC5-RRC connection (or the PC5-S unicast link established by PC5-S entity, the destination or the pair of a Source Layer-2 ID and a Destination Layer-2 ID).

The Sidelink HARQ Entity shall for each PC5-RRC connection that has established by RRC (or for each PC5-S unicast link established by PC5-S entity, each destination or each pair of a Source Layer-2 ID and a Destination Layer-2 ID):

1> if maxHARQRetxThreshold is configured by RRC (i.e. initial step of HARQ based RLM e.g. upon establishment of a PC5-RRC connection or PC5-S unicast link), or
1> if a parameter related to establishment of a PC5-RRC connection or PC5-S unicast link is indicated by upper layers; or
1> if a SCI transmission scheduling a very first (re-) transmission is received for the PC5-RRC connection (or the PC5-S unicast link established by PC5-S entity, the destination or the pair of a Source Layer-2 ID and a Destination Layer-2 ID); or
1> if a very first (re-)transmission is received by this sidelink HARQ entity for the PC5-RRC connection (or the PC5-S unicast link established by PC5-S entity, the destination or the pair of a Source Layer-2 ID and a Destination Layer-2 ID); or
1> if N acknowledgements have been transmitted on PSFCH either consecutively or in an interval; or
Option 1: the N acknowledgements correspond to only positive acknowledgements successfully transmitted on PSFCH;
Option 2: the N acknowledgements correspond to only negative acknowledgements successfully transmitted on PSFCH;
Option 3: the N acknowledgements correspond to both positive and negative acknowledgements successfully transmitted on PSFCH;
Wherein the N acknowledgements do not include unsuccessful transmission of any acknowledgement on PSFCH i.e. no HARQ feedback transmission of an acknowledgement from this UE (e.g. because this UE does not successfully receive the corresponding PSCCH and/or PSSCH).
Wherein N can be one or more.
2> set the MAX_RLM_ReTX_COUNT to zero.
1> if a sidelink transmission on PSCCH and/or PSSCH previously indicated or scheduled by any SCI has been unsuccessfully received; or
1> if a negative acknowledgement to a transmission of any MAC PDU has been transmitted on PSFCH; or
1> if no acknowledgement to a transmission of any MAC PDU has been transmitted on PSFCH:
2> increment the MAX_RLM_ReTX_COUNT.
1> if MAX_RLM_ReTX_COUNT=maxHARQRetxThreshold:
indicate to RRC that max HARQ retransmission has been reached.

Upon receiving this indication from the MAC entity, UE RRC declares sidelink radio link failure on the corresponding PC5-RRC connection (or the corresponding pair or the corresponding destination)

Hereinafter, a method for indicating sidelink radio link failure in a wireless communication system, according to some embodiments of the present disclosure will be described. The method may be performed by a wireless device, for example, a UE.

According to some embodiments of the present disclosure, a UE may perform HARQ-based Sidelink RLF detection.

The HARQ-based Sidelink RLF detection procedure is used to detect Sidelink RLF based on a number of consecutive DTX on PSFCH reception occasions for a PC5-RRC connection.

RRC configures the following parameter to control HARQ-based Sidelink RLF detection:
sl-maxNumConsecutiveDTX The following UE variable is used for HARQ-based Sidelink RLF detection.
numConsecutiveDTX, which is maintained for each PC5-RRC connection.

The Sidelink HARQ Entity shall (re-)initialize numConsecutiveDTX to zero for each PC5-RRC connection which has been established by upper layers, if any, upon establishment of the PC5-RRC connection or (re)configuration of sl-maxNumConsecutiveDTX.

The Sidelink HARQ Entity shall for each PSFCH reception occasion associated to the PSSCH transmission:
1> if PSFCH reception is absent on the PSFCH reception occasion:
2> increment numConsecutiveDTX by 1;
2> if numConsecutiveDTX reaches sl-maxNumConsecutiveDTX:
3> indicate HARQ-based Sidelink RLF detection to RRC.
1> else:
2> re-initialize numConsecutiveDTX to zero.

Hereinafter, an apparatus for indicating sidelink radio link failure in a wireless communication system, according to some embodiments of the present disclosure, will be described. Herein, the apparatus may be a wireless device (100 or 200) in FIGS. 2, 3, and 5.

For example, a first wireless device may perform methods described above. The detailed description overlapping with the above-described contents could be simplified or omitted.

Referring to FIG. 5, a first wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to configure a maximum number of a counter for a PC5-Radio Resource Control (RRC) connection with a second wireless device. The processor 102 may be configured to initialize the counter to zero upon 1) establishing the PC5-RRC connection with the second wireless device, or 2) configuring or reconfiguring the maximum number of the counter. The processor 102 may be configured to control the transceiver 106 to perform a transmission of a Medium Access Control (MAC) Protocol Data Unit (PDU) to the second wireless device based on the established PC5-RRC connection. The processor 102 may be configured to increase the counter based on no reception of any acknowledgement to the transmission of the MAC PDU. The processor 102 may be configured to indicate Sidelink (SL) Radio Link Failure (RLF) for the PC5-RRC connection based on that the counter reaches the maximum number of the counter.

According to some embodiments of the present disclosure, the processor 102 may be configured to inform the SL RLF to the network.

According to some embodiments of the present disclosure, the processor 102 may be configured to control an SL Hybrid automatic repeat request (HARQ) entity of the first wireless device to inform the SL RLF to an RRC entity of the first wireless device.

According to some embodiments of the present disclosure, the processor 102 may be configured to configure the counter for each of multiple PC5-RRC connections with other wireless devices.

According to some embodiments of the present disclosure, the processor 102 may be configured to configure another counter for another PC5-RRC connection with a third wireless device.

For example, the processor 102 may be configured to initialize the other counter to zero upon 1) establishing the other PC5-RRC connection with the third wireless device, or 2) configuring or reconfiguring a maximum number of the other counter for the other PC5-RRC connection with the third wireless device.

For example, a maximum number of the other counter for the other PC5-RRC connection with the third wireless device may be same as the maximum number of the counter for the PC5-RRC connection with the second wireless device.

According to some embodiments of the present disclosure, the processor 102 may be configured to monitor each Physical Sidelink Feedback Channel (PSFCH) reception occasion associated to the transmission of the MAC PDU. Based on that PSFCH reception is absent on the PSFCH reception occasion, the processor 102 may be configured to increment the counter.

According to some embodiments of the present disclosure, the processor 102 may be configured to re-initialize the counter to zero based on reception of any acknowledgement to the transmission of the MAC PUD.

For example, the processor 102 may be configured to monitor each PSFCH reception occasion associated to the transmission of the MAC PDU. Based on that PSFCH reception is not absent on the PSFCH reception occasion, the processor 102 may be configured to re-initialize the counter to zero.

According to some embodiments of the present disclosure, the transmission of the MAC PDU may include a PSSCH transmission for a pair of source layer-2 ID of the first wireless device and destination layer 2-ID of the second wireless device corresponding to the PC5-RRC connection.

According to some embodiments of the present disclosure, the processor 102 may be configured to be in communication with at least one of a user equipment, a network, or an autonomous vehicle other than the first wireless device.

Hereinafter, a processor for a first wireless device for indicating sidelink radio link failure in a wireless communication system, according to some embodiments of the present disclosure, will be described.

The processor may be configured to control the first wireless device to configure a maximum number of a counter for a PC5-Radio Resource Control (RRC) connection with a second wireless device. The processor may be configured to control the first wireless device to initialize the counter to zero upon 1) establishing the PC5-RRC connection with the second wireless device, or 2) configuring or reconfiguring the maximum number of the counter. The processor may be configured to control the first wireless device to perform a transmission of a Medium Access Control (MAC) Protocol Data Unit (PDU) to the second wireless device based on the established PC5-RRC connection. The processor may be configured to control the first wireless device to increase the counter based on no reception of any acknowledgement to the transmission of the MAC PDU. The processor may be configured to control the first wireless device to indicate Sidelink (SL) Radio Link Failure (RLF) for the PC5-RRC connection based on that the counter reaches the maximum number of the counter.

According to some embodiments of the present disclosure, the processor may be configured to control the first wireless device to inform the SL RLF to the network.

According to some embodiments of the present disclosure, the processor may be configured to control the first wireless device to control an SL Hybrid automatic repeat request (HARQ) entity of the first wireless device to inform the SL RLF to an RRC entity of the first wireless device.

According to some embodiments of the present disclosure, the processor may be configured to control the first wireless device to configure the counter for each of multiple PC5-RRC connections with other wireless devices.

According to some embodiments of the present disclosure, the processor may be configured to control the first wireless device to configure another counter for another PC5-RRC connection with a third wireless device.

For example, the processor may be configured to control the first wireless device to initialize the other counter to zero upon 1) establishing the other PC5-RRC connection with the third wireless device, or 2) configuring or reconfiguring a maximum number of the other counter for the other PC5-RRC connection with the third wireless device.

For example, a maximum number of the other counter for the other PC5-RRC connection with the third wireless device may be same as the maximum number of the counter for the PC5-RRC connection with the second wireless device.

According to some embodiments of the present disclosure, the processor may be configured to control the first wireless device to monitor each Physical Sidelink Feedback Channel (PSFCH) reception occasion associated to the transmission of the MAC PDU. Based on that PSFCH reception is absent on the PSFCH reception occasion, the processor may be configured to control the first wireless device to increment the counter.

According to some embodiments of the present disclosure, the processor may be configured to control the first wireless device to re-initialize the counter to zero based on reception of any acknowledgement to the transmission of the MAC PUD.

For example, the processor may be configured to control the first wireless device to monitor each PSFCH reception occasion associated to the transmission of the MAC PDU. Based on that PSFCH reception is not absent on the PSFCH reception occasion, the processor may be configured to control the first wireless device to re-initialize the counter to zero.

According to some embodiments of the present disclosure, the transmission of the MAC PDU may include a PSSCH transmission for a pair of source layer-2 ID of the first wireless device and destination layer 2-ID of the second wireless device corresponding to the PC5-RRC connection.

According to some embodiments of the present disclosure, the processor may be configured to control the first wireless device to be in communication with at least one of a user equipment, a network, or an autonomous vehicle other than the first wireless device.

Hereinafter, a non-transitory computer-readable medium has stored thereon a plurality of instructions for indicating sidelink radio link failure in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a first wireless device.

The stored a plurality of instructions may cause the first wireless device to configure a maximum number of a counter for a PC5-Radio Resource Control (RRC) connection with a second wireless device. The stored a plurality of instructions may cause the first wireless device to initialize the counter to zero upon 1) establishing the PC5-RRC connection with the second wireless device, or 2) configuring or reconfiguring the maximum number of the counter. The stored a plurality of instructions may cause the first wireless device to perform a transmission of a Medium Access Control (MAC) Protocol Data Unit (PDU) to the second wireless device based on the established PC5-RRC connection. The stored a plurality of instructions may cause the first wireless device to increase the counter based on no reception of any acknowledgement to the transmission of the MAC PDU. The stored a plurality of instructions may cause the first wireless device to indicate Sidelink (SL) Radio Link Failure (RLF) for the PC5-RRC connection based on that the counter reaches the maximum number of the counter.

According to some embodiments of the present disclosure, the stored a plurality of instructions may cause the first wireless device to inform the SL RLF to the network.

According to some embodiments of the present disclosure, the stored a plurality of instructions may cause the first wireless device to control an SL Hybrid automatic repeat request (HARQ) entity of the first wireless device to inform the SL RLF to an RRC entity of the first wireless device.

According to some embodiments of the present disclosure, the stored a plurality of instructions may cause the first wireless device to configure the counter for each of multiple PC5-RRC connections with other wireless devices.

According to some embodiments of the present disclosure, the stored a plurality of instructions may cause the first wireless device to configure another counter for another PC5-RRC connection with a third wireless device.

For example, the stored a plurality of instructions may cause the first wireless device to initialize the other counter to zero upon 1) establishing the other PC5-RRC connection with the third wireless device, or 2) configuring or reconfiguring a maximum number of the other counter for the other PC5-RRC connection with the third wireless device.

For example, a maximum number of the other counter for the other PC5-RRC connection with the third wireless device may be same as the maximum number of the counter for the PC5-RRC connection with the second wireless device.

According to some embodiments of the present disclosure, the stored a plurality of instructions may cause the first wireless device to monitor each Physical Sidelink Feedback Channel (PSFCH) reception occasion associated to the transmission of the MAC PDU. Based on that PSFCH reception is absent on the PSFCH reception occasion, the stored a plurality of instructions may cause the first wireless device to increment the counter.

According to some embodiments of the present disclosure, the stored a plurality of instructions may cause the first wireless device to re-initialize the counter to zero based on reception of any acknowledgement to the transmission of the MAC PUD.

For example, the stored a plurality of instructions may cause the first wireless device to monitor each PSFCH reception occasion associated to the transmission of the MAC PDU. Based on that PSFCH reception is not absent on the PSFCH reception occasion, the stored a plurality of instructions may cause the first wireless device to re-initialize the counter to zero.

According to some embodiments of the present disclosure, the transmission of the MAC PDU may include a PSSCH transmission for a pair of source layer-2 ID of the first wireless device and destination layer 2-ID of the second wireless device corresponding to the PC5-RRC connection.

According to some embodiments of the present disclosure, the stored a plurality of instructions may cause the first wireless device to be in communication with at least one of a user equipment, a network, or an autonomous vehicle other than the first wireless device.

Hereinafter, a method for indicating sidelink radio link failure performed by a base station (BS) in a wireless communication system, according to some embodiments of the present disclosure, will be described.

The BS may transmit, to a first wireless device, configuration for a maximum number of a counter for a PC5-Radio Resource Control (RRC) connection with a second wireless device. The BS may receive, from the first device, Sidelink (SL) Radio Link Failure (RLF) for the PC5-RRC connection based on that the counter reaches the maximum number of the counter.

Hereinafter, a base station (BS) for indicating sidelink radio link failure in a wireless communication system, according to some embodiments of the present disclosure, will be described.

The BS may include a transceiver, a memory, and a processor operatively coupled to the transceiver and the memory.

The processor may be configured to control the transceiver to transmit, to a first wireless device, configuration for a maximum number of a counter for a PC5-Radio Resource Control (RRC) connection with a second wireless device. The processor may be configured to control the transceiver to receive, from the first device, Sidelink (SL) Radio Link Failure (RLF) for the PC5-RRC connection based on that the counter reaches the maximum number of the counter.

The present disclosure can have various advantageous effects.

According to some embodiments of the present disclosure, a wireless device could indicate sidelink (SL) radio link failure (RLF) in a wireless communication system efficiently.

For example, a wireless device performing radio link management by using HARQ feedback can properly detect radio link failure by considering HARQ feedback transmissions from another wireless device.

For example, a UE can properly detect radio link failure by considering HARQ feedback transmissions from another UE when the UE establishes a sidelink connection with a peer UE.

For example, a wireless communication system could properly provide radio link management for sidelink connection for a UE performing HARQ transmissions.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device in a wireless communication system, the method comprising,
    configuring a maximum number of a counter for a PC5-Radio Resource Control (RRC) connection with a second wireless device;
    initializing the counter to zero upon 1) establishing the PC5-RRC connection with the second wireless device, or 2) configuring the maximum number of the counter;
    performing a Physical Sidelink Shared Channel (PSSCH) transmission to the second wireless device based on the established PC5-RRC connection;
    increasing the counter based on Physical Sidelink Feedback Channel (PSFCH) reception is absent on each PSFCH reception occasion associated with the PSSCH transmission;
    declaring Sidelink (SL) Radio Link Failure (RLF) for the PC5-RRC connection based on that the counter reaches the maximum number of the counter; and
    informing the network of the SL RLF for the PC5-RRC connection.

2. The method of claim 1, wherein the method further comprises,
    indicating, by a SL Hybrid automatic repeat request (HARQ) entity of the first wireless device to an RRC entity of the first wireless device, the SL RLF based on that the counter reaches the maximum number of the counter.

3. The method of claim 1, wherein the method further comprises,
    configuring the counter for each of multiple PC5-RRC connections with other wireless devices.

4. The method of claim 1, wherein the method further comprises,
    configuring another counter for another PC5-RRC connection with a third wireless device.

5. The method of claim 4, wherein the method further comprises,
    initializing the other counter to zero upon 1) establishing the other PC5-RRC connection with the third wireless device, or 2) configuring a maximum number of the other counter for the other PC5-RRC connection with the third wireless device.

6. The method of claim 4, wherein a maximum number of the other counter for the other PC5-RRC connection with the third wireless device is same as the maximum number of the counter for the PC5-RRC connection with the second wireless device.

7. The method of claim 1, wherein the increasing the counter further comprises,
    monitoring each PSFCH reception occasion associated with the PSSCH transmission.

8. The method of claim 1, wherein the method further comprises,
    re-initializing the counter to zero based on PSFCH reception associated with the PSSCH transmission.

9. The method of claim 8, wherein the re-initializing the counter to zero further comprises,
    monitoring each PSFCH reception occasion associated to the PSSCH transmission; and
    based on that the PSFCH reception is not absent on the PSFCH reception occasion, re-initializing the counter to zero.

10. The method of claim 1, wherein the PSSCH transmission includes a PSS CH transmission for a pair of source layer-2 ID of the first wireless device and destination layer 2-ID of the second wireless device corresponding to the PC5-RRC connection.

11. The method of claim 1, wherein the first wireless device is in communication with at least one of a user equipment, a network, or an autonomous vehicle other than the first wireless device.

12. A first wireless device in a wireless communication system comprising:
    a transceiver;
    a memory; and at least one processor operatively coupled to the transceiver and the memory, and configured to:

configure a maximum number of a counter for a PC5-Radio Resource Control (RRC) connection with a second wireless device;

initialize the counter to zero upon 1) establishing the PC5-RRC connection with the second wireless device, or 2) configuring the maximum number of the counter;

control the transceiver to perform a Physical Sidelink Shared Channel (PSSCH) transmission to the second wireless device based on the established PC5-RRC connection;

increase the counter based on Physical Sidelink Feedback Channel (PSFCH) reception is absent on each PSFCH reception occasion associated with the PSSCH transmission; and declare Sidelink (SL) Radio Link Failure (RLF) for the PC5-RRC connection based on that the counter reaches the maximum number of the counter; and control the transceiver to inform the network of the SL RLF for the PC5-RRC connection.

13. The first wireless device of claim 12, wherein the at least one processor is further configured to, control an SL Hybrid automatic repeat request (HARQ) entity of the first wireless device to indicate the SL RLF to an RRC entity of the first wireless device based on that the counter reaches the maximum number of the counter.

14. The first wireless device of claim 12, wherein the at least one processor is further configured to, configure the counter for each of multiple PC5-RRC connections with other wireless devices.

15. The first wireless device of claim 12, wherein the at least one processor is further configured to, configure another counter for another PC5-RRC connection with a third wireless device.

16. The first wireless device of claim 15, wherein the at least one processor is further configured to, initialize the other counter to zero upon 1) establishing the other PC5-RRC connection with the third wireless device, or 2) configuring a maximum number of the other counter for the other PC5-RRC connection with the third wireless device.

17. The first wireless device of claim 15, wherein a maximum number of the other counter for the other PC5-RRC connection with the third wireless device is same as the maximum number of the counter for the PC5-RRC connection with the second wireless device.

18. A non-transitory computer-readable medium having stored thereon a plurality of instructions, which, when executed by a processor of a first wireless device, cause the first wireless device to:

configure a maximum number of a counter for a PC5-Radio Resource Control (RRC) connection with a second wireless device;

initialize the counter to zero upon 1) establishing the PC5-RRC connection with the second wireless device, or 2) configuring the maximum number of the counter;

perform a Physical Sidelink Shared Channel (PSSCH) transmission to the second wireless device based on the established PC5-RRC connection;

increase the counter based on no Physical Sidelink Feedback Channel (PSFCH) reception associated with the PSSCH transmission; and declaring Sidelink (SL) Radio Link Failure (RLF) for the PC5-RRC connection based on that the counter reaches the maximum number of the counter; and informing the network of the SL RLF for the PC5-RRC connection.

* * * * *